United States Patent
Connor et al.

(10) Patent No.: US 7,063,730 B2
(45) Date of Patent: Jun. 20, 2006

(54) FILTER WITH END CAP BASE RETAINER

(75) Inventors: Michael J. Connor, Stoughton, WI (US); Rebecca Beier, Milwaukee, WI (US); Mark V. Holzmann, Stoughton, WI (US); Robert A. Bannister, Stoughton, WI (US); Michael R. Furseth, Cambridge, WI (US)

(73) Assignee: Fleetguard, Inc., Nashville, TN (US)

( * ) Notice: Subject to any disclaimer, the term of this patent is extended or adjusted under 35 U.S.C. 154(b) by 140 days.

(21) Appl. No.: 10/690,144

(22) Filed: Oct. 21, 2003

(65) Prior Publication Data

US 2005/0081497 A1  Apr. 21, 2005

(51) Int. Cl.
*B01D 46/00* (2006.01)

(52) U.S. Cl. .............................. 55/493; 55/507; 55/511

(58) Field of Classification Search ............... 55/385.3, 55/490, 493, 498, 502, 505, 506, 507, 511; 210/232, 448
See application file for complete search history.

(56) References Cited

U.S. PATENT DOCUMENTS

| | | | |
|---|---|---|---|
| 3,187,714 A * | 6/1965 | Flanigan ..................... | 116/309 |
| 3,732,667 A | 5/1973 | Fromknecht et al. | |
| 3,796,027 A | 3/1974 | Gumtow | |
| 4,006,000 A | 2/1977 | Tortorici et al. | |
| 4,204,960 A * | 5/1980 | Sugiyama et al. .......... | 210/232 |
| 4,386,949 A | 6/1983 | Bassi | |
| 4,514,875 A * | 5/1985 | Comer ........................ | 15/349 |
| 4,692,177 A | 9/1987 | Wright et al. | |
| 4,838,901 A | 6/1989 | Schmidt et al. | |
| 4,950,317 A | 8/1990 | Dottermans | |
| 4,955,996 A * | 9/1990 | Edwards et al. ............... | 55/302 |
| 5,295,602 A | 3/1994 | Swanson | |
| 5,865,863 A * | 2/1999 | DeSousa et al. ........... | 55/385.3 |
| 5,882,367 A | 3/1999 | Morgan et al. | |
| 6,017,379 A * | 1/2000 | Kauffman ..................... | 55/496 |
| 6,056,799 A * | 5/2000 | Unrath et al. ................. | 55/502 |
| 6,093,231 A * | 7/2000 | Read et al. .................... | 55/498 |
| 6,231,630 B1* | 5/2001 | Ernst et al. ................ | 55/385.3 |
| 6,299,661 B1 | 10/2001 | Bloomer | |
| 6,334,887 B1 | 1/2002 | Coulonvaux | |
| 6,425,930 B1 | 7/2002 | Wake et al. | |
| 6,436,162 B1 | 8/2002 | Wake et al. | |
| 6,440,188 B1* | 8/2002 | Clements et al. ............. | 55/378 |
| 6,569,219 B1* | 5/2003 | Connor et al. ................ | 55/495 |
| 6,626,973 B1* | 9/2003 | Park ............................ | 55/480 |
| 6,790,251 B1* | 9/2004 | Brady, Jr. .................... | 55/419 |
| 2001/0037969 A1* | 11/2001 | Stankowski ................. | 210/348 |
| 2002/0069625 A1 | 6/2002 | Stass | |

FOREIGN PATENT DOCUMENTS

WO  01/25105  4/2001

* cited by examiner

*Primary Examiner*—Frank M. Lawrence
(74) *Attorney, Agent, or Firm*—Andrus, Sceales, Starke & Sawall, LLP (57) ABSTRACT

A filter includes a filter element mounted to a base and having first and second end caps spaced axially along an axis. Fluid to be filtered flows laterally through the filter element and axially through a hollow interior and through an axial flow opening of the second end cap. The filter element is mounted to the base solely by the second end cap independently of the first end cap, eliminating the need for a third component traditionally needed for mounting a housing cover to the base and enclosing and/or sealing and/or retaining the filter element in the housing.

17 Claims, 7 Drawing Sheets

FILTER WITH END CAP BASE RETAINER

BACKGROUND AND SUMMARY

The invention relates to filters, including air filters, and more particularly to a low cost mounting and retention system.

An air filter traditionally includes three components, namely: (1) a filter element; (2) a housing base; and (3) a housing cover mounted to the base and enclosing and/or sealing and/or retaining the filter element in the housing. The present invention eliminates the need for the third component, and makes the use of a cover optional. In the preferred embodiment, the invention eliminates the need for the third component, by directly attaching/retaining and sealing the first component to the second component, independently of the third component (the cover). The invention is particularly useful as an intake air cleaner for internal combustion engines.

DETAILED DESCRIPTION

Figure 1:
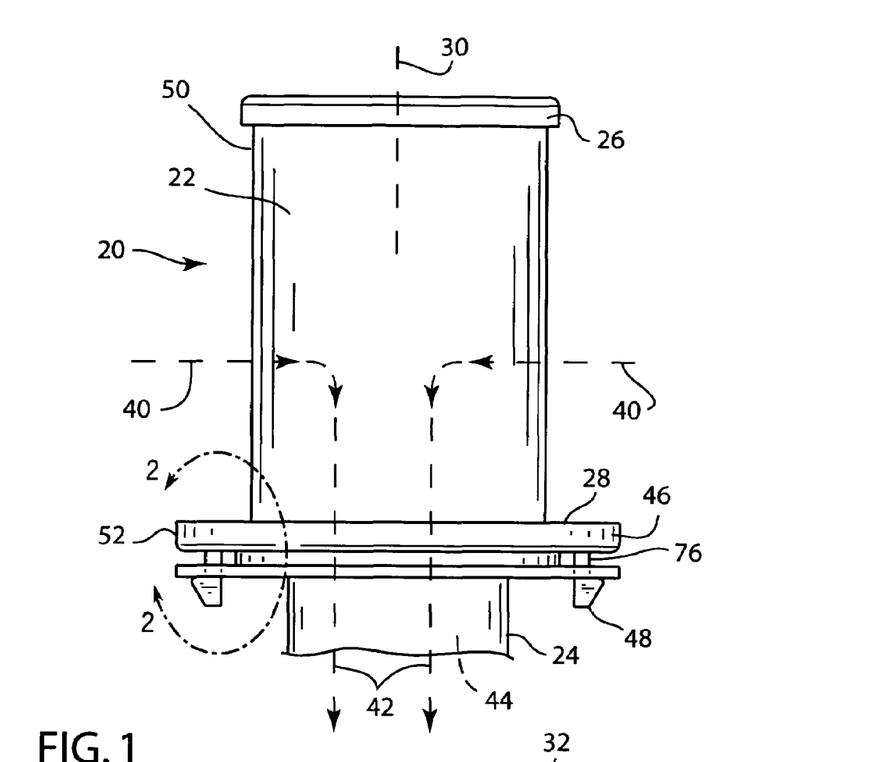
FIG. 1 is a side elevation view of a filter in accordance with the invention.

FIG. 1 shows a filter 20 including a filter element 22 mounted to a base 24. Filter element 22 has first and second end caps 26 and 28 axially spaced along an axis 30. End cap 28 has an axial flow opening 30 therethrough, FIG. 2. The filter element includes filter media 32, which may be pleated, FIG. 5, and which may have an outer liner 34 and/or an inner liner 36, FIG. 2, extending axially between end caps 26 and 28 and extending in a closed–loop, e.g. a circular annulus, an oval, a racetrack shape, etc., around a perimeter defining a hollow interior 38 communicating with axial flow opening 30. End caps 26 and 28 are preferably plastic, and filter media 32 is preferably embedded or potted therein in accordance with known embedding/dispensing technology. Fluid to be filtered flows laterally through the filter media, as shown at dashed line arrows 40, FIGS. 1, 2, and axially, as shown at dashed arrows 42, through hollow interior 38 and axial flow opening 30 into interior passage 44 in base 24 for delivery to the air intake of an internal combustion engine (not shown). Upper end cap 26 is a closed end cap spanning and closing hollow interior 38 of filter element 22. Filter element 22 is mounted to base 24 by end cap 28. The filter element is mounted to the base solely by end cap 28 and independently of end cap 26. A retainer, to be described, co-acts between end cap 28 and base 24 and applies axial retention force therebetween independently of end cap 26, and independently of any cover forming a housing with the base and around the filter element.

Figure 2:
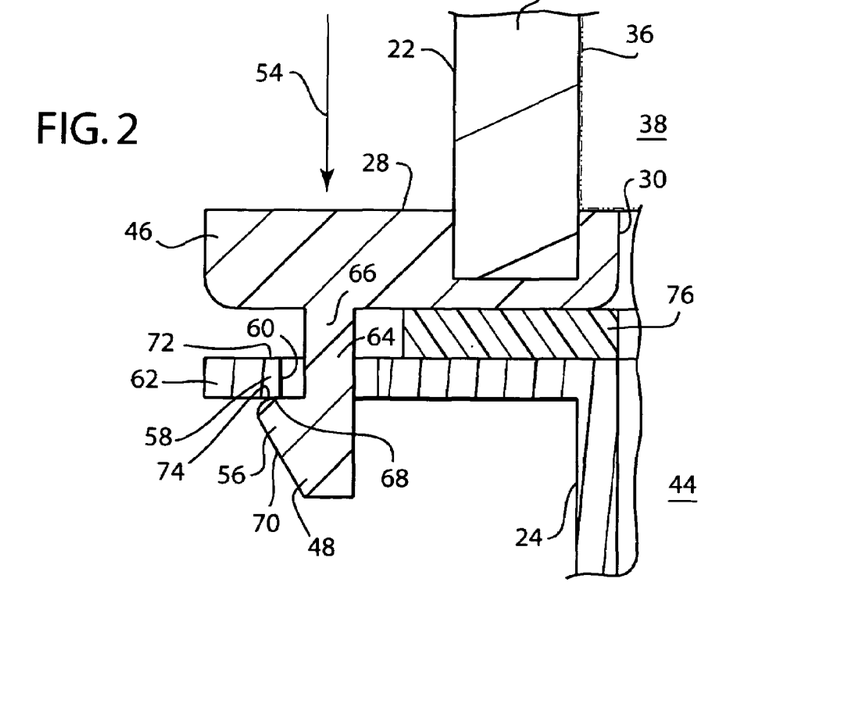
FIG. 2 is an enlarged sectional view of a portion of FIG. 1 as shown at line 2—2.

End cap 28 extends laterally outwardly to an outer flange 46 laterally outward of filter media 32. A retainer 48 on outer flange 46 mounts filter element 22 at end cap 28 to base 24. Filter media 32 has an outer border 50, FIG. 1. Outer flange 46 has an outer border 52 laterally outward of outer border 50 and sufficiently laterally extended therefrom to accommodate retainer 48 along the lateral dimension between outer borders 50 and 52. Retainer 48 mounts end cap 28 to base 24 in snap-fit relation with rectilinearly unidirectional axial insertion as shown at arrow 54, FIG. 2. In FIG. 2, the retainer is provided by a hook 56 on end cap 28, and a catch 58 on base 24 as provided by a slot or opening 60 in a flange 62 extending laterally from the base. Hook 56 is on a shank 64 which extends axially from a partially flexible hinge on end cap 28. Hook 56 is laterally moveable about hinge 66 toward and away from the edge of slot or opening 60 of base 24 and into and out of engagement with catch 58. laterally extended therefrom to accommodate retainer 46 along the lateral dimension between outer borders 50 and 52. Retainer 48 mounts end cap 28 to base 24 in snap-fit relation with rectilinearly unidirectional axial insertion as shown at arrow 54, FIG. 2. In FIG. 2, the retainer is provided by a hook 56 on end cap 28, and a catch 58 on base 24 as provided by a slot or opening 60 in a flange 62 extending laterally from the base. Hook 56 is on a shank 64 which extends axially from a partially flexible hinge on end cap 28. Hook 56 is laterally moveable about hinge 66 toward and away from the edge of slot or opening 60 of base 24 and into and out of engagement with catch 58.

Hook 56 has oppositely axially facing surfaces 68 and 70. Catch 58 has oppositely axially facing surfaces 72 and 74. End cap 28 is mounted to base 24 with axial insertion motion 54 wherein surfaces 70 and 72 are camming surfaces and engage in camming relation to cam hook 56 laterally in a first lateral direction (rightwardly in FIG. 2) until surface 68 moves axially past surface 74, whereupon hook 56 snaps back laterally in a second lateral direction (leftwardly in FIG. 2) opposite to the noted first lateral direction such that surface 68 axially aligns with and axially engages surface 74 and prevents axial separation of end cap 28 from base 24, i.e. prevents upward movement of end cap 28 in FIGS. 1 and 2. Surface 68 faces axially toward hinge 66. Surface 70 faces axially away from hinge 66. Surface 74 faces axially away from hinge 66. Surface 72 faces axially toward end cap 26. Surface 74 faces axially away from end cap 26. Hook 56 is manually laterally moveable in the noted first lateral direction (rightwardly in FIG. 2) about hinge 66, e.g. by grasping the hook with the fingers of a technician and pinching the hook laterally inwardly, to move surface 68 laterally inwardly out of axial alignment with and out of axial engagement with surface 74, to release hook 56 from catch 58 and permit axial separation of end cap 28 and base 24, i.e. axial upward movement of end cap 28 in FIG. 2. Surface 72 faces axially toward hinge 66. End caps 26 and 28 and base 24 are preferably plastic, and hinge 66 is a living hinge. If desired, an axial sealing gasket 76 is provided between base 24 and end cap 28 and retained in sealing relation by the retainer provided by hook 56 and catch 58.

Figure 3:
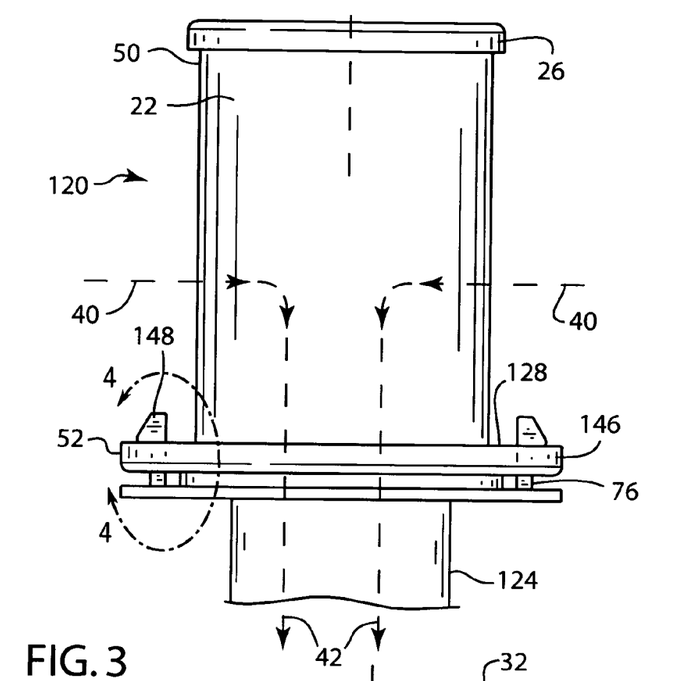
FIG. 3 is like FIG. 1 and shows another embodiment.
Figure 4:
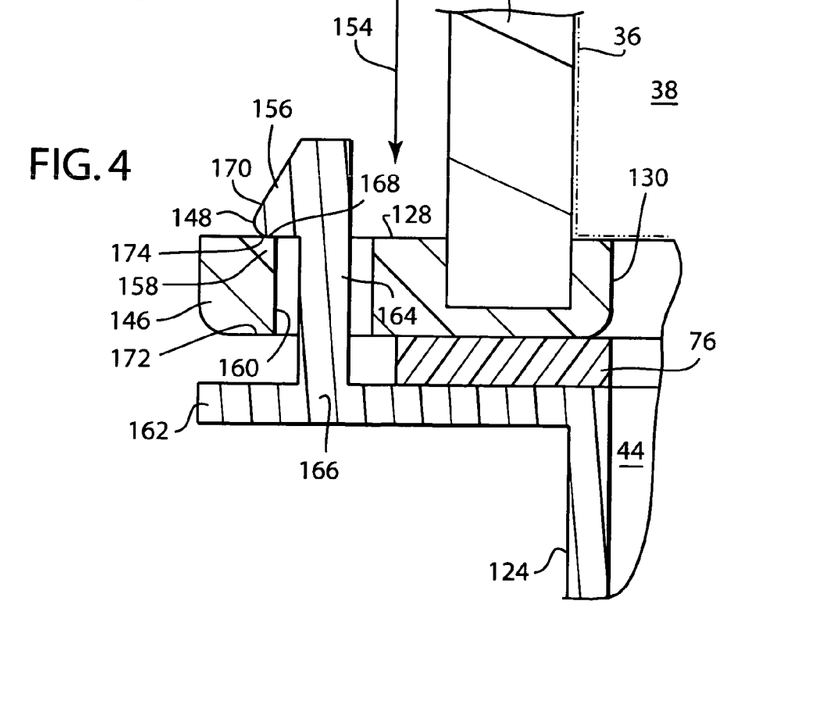
FIG. 4 is an enlarged sectional view of a portion of FIG. 3 as shown at line 4—4.

FIGS. 3 and 4 show another embodiment and use like reference numerals from above where appropriate to facilitate understanding. Filter 120 includes filter element 22 mounted to base 124 and having end caps 26 and 128 spaced axially along axis 30. End cap 128 has an axial flow opening 130 therethrough. Filter media 32 extends axially between end caps 26 and 128 and extends in a closed-loop around a perimeter defining hollow interior 38 communicating with axial flow opening 130. Fluid to be filtered flows laterally through filter media 32 as shown at dashed arrows 40, and axially as shown at dashed arrows 42 through hollow interior 38 and axial flow opening 130. Filter element 120 is mounted to base 124 by end cap 128. Filter element 120 is mounted to base 124 solely by end cap 128, independently of end cap 26. A retainer, to be described, co-acts between end cap 128 and base 124 and applies axial retention force therebetween, independently of end cap 26, and independently of any cover forming a housing with the base and around the filter element.

End cap 128 extends laterally outwardly to an outer flange 146 laterally outward of filter media 32. A retainer 148 mounts the filter element at end cap 128 to base 124. Filter media 32 has the noted first outer border 50. Outer flange 146 has the noted second outer border 52 laterally outward of outer border 50 and sufficiently laterally extended therefrom to accommodate retainer 148 along the lateral dimension between first and second outer borders 50 and 52. Retainer 148 mounts end cap 128 to base 124 in snap-fit relation with rectilinearly unidirectional axial insertion 154. Retainer 148 is provided by a hook 156 on laterally extended flange 162 of base 124, and a catch 158 on laterally extended flange 146 of end cap 128. Hook 156 is on a shank 164 which extends axially from a hinge 166 of base 124. Hook 156 is laterally moveable about hinge 166 toward and away from the edge of slot or opening 160 of end cap 128 into and out of engagement with catch 158.

Hook 156 has oppositely axially facing surfaces 168 and 170. Catch 158 has oppositely axially facing surfaces 172 and 174. End cap 128 is mounted to base 124 with axial insertion motion 154. Surfaces 170 and 172 are camming surfaces and engage in camming relation to cam hook 156 laterally in a first lateral direction (rightwardly in FIG. 4) until surface 168 moves axially past surface 172, whereupon hook 156 snaps back laterally in a second lateral direction (leftwardly in FIG. 4) opposite to the noted first lateral direction, such that surface 168 axially aligns with and axially engages surface 174 and prevents axial separation of end cap 128 and base 124, i.e. prevents axial upward movement of end cap 128 in FIG. 4. Surface 168 faces axially toward hinge 166. Surface 170 faces axially away from hinge 166. Surface 172 faces axially away from end cap 26. Surface 174 faces axially toward end cap 26. Hook 156 is manually laterally moveable in the noted first lateral direction (rightwardly in FIG. 4, e.g. by manual engagement and pinching by the fingers of the operator) about hinge 166 to move surface 168 laterally rightwardly in FIG. 4 out of axial alignment with and out of axial engagement with surface 174, to release hook 156 from catch 158 and permit axial separation of end cap 128 and base 124, i.e. upward axial movement of end cap 128 in FIG. 4. End caps 26 and 128 and base 124 are preferably plastic, and hinge 166 is preferably a spring lever.

Figure 5:
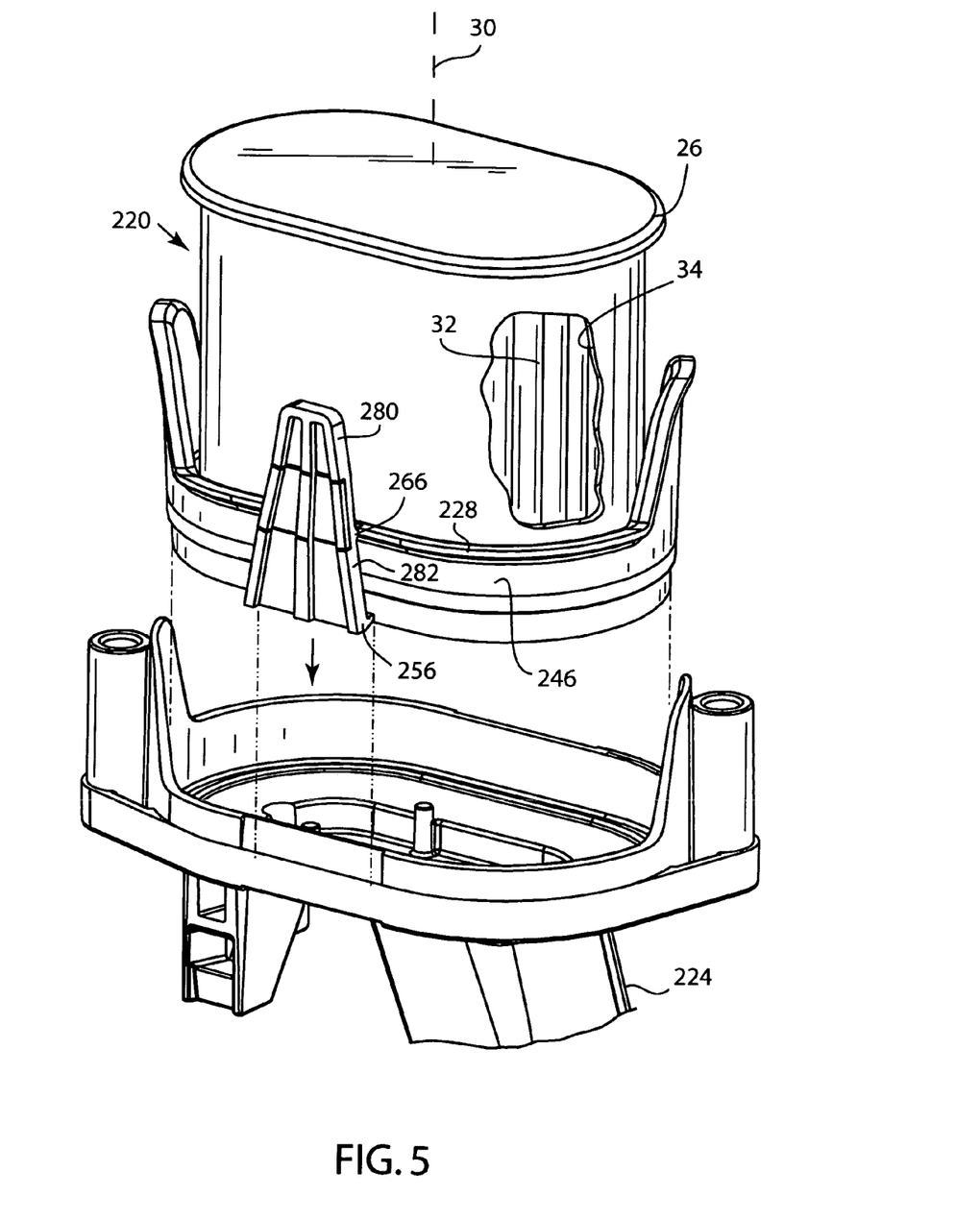
FIG. 5 is an exploded perspective view of another embodiment.
Figures 6, 7:
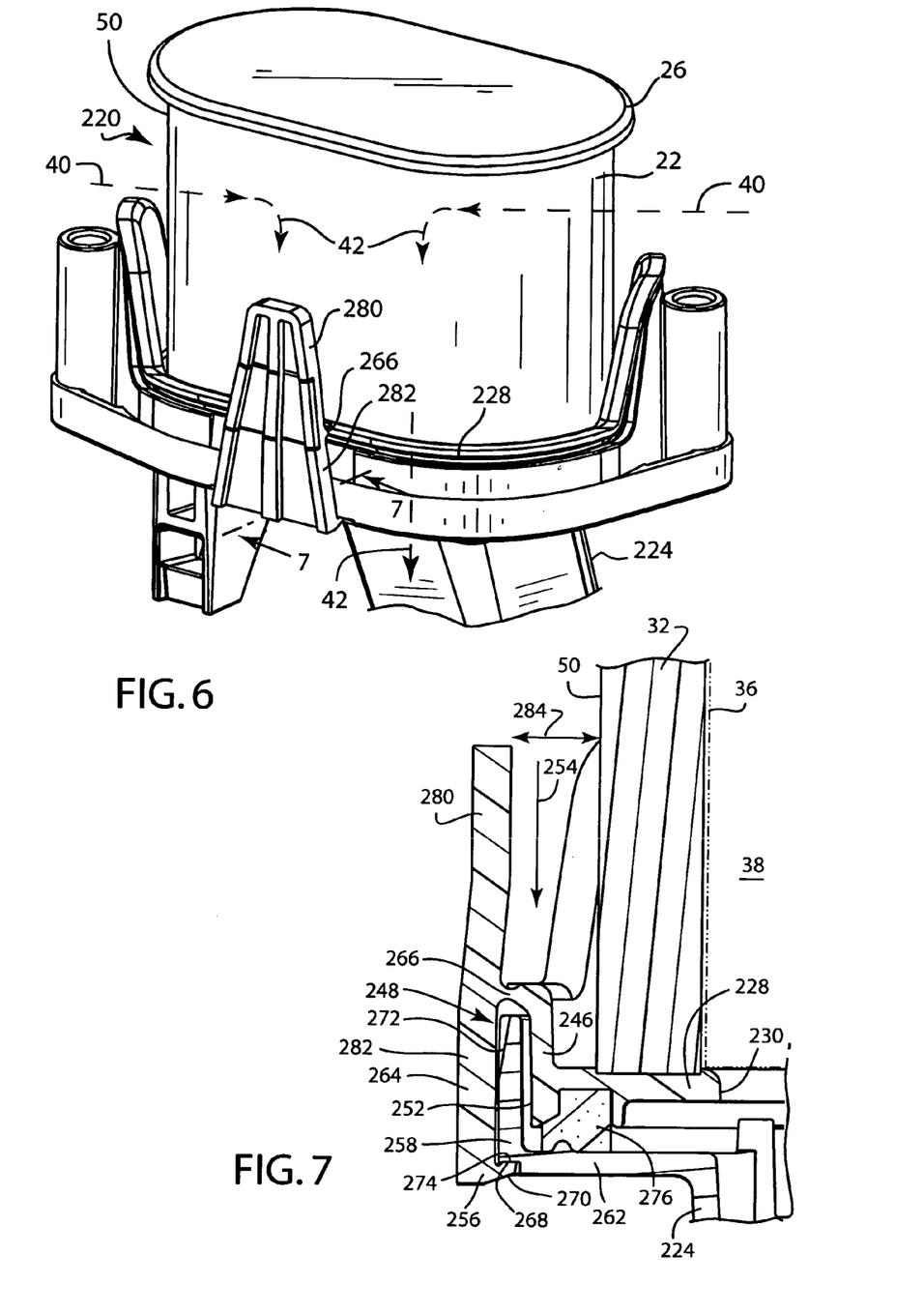
FIG. 6 is a perspective assembly view of the filter of FIG. 5.
FIG. 7 is a sectional view taken along line 7—7 of FIG. 6.

FIGS. 5–7 show a further embodiment, and use like reference numerals from above where appropriate to facilitate understanding. Filter 220 includes filter element 22 mounted to base 224. The filter element has first and second end caps 26 and 228 axially spaced along axis 30. End cap 228 has an axial flow opening 230 therethrough, FIG. 7. Filter media 32 extends axially between end caps 26 and 228, and extends in a closed-loop around a perimeter defining the noted hollow interior 38 communicating with axial flow opening 230. Fluid to be filtered flows laterally as shown at dashed arrows 40 through the filter media and axially as shown at dashed arrows 42 through hollow interior 38 and axial flow opening 230. Filter element 220 is mounted to base 224 solely by end cap 228, independently of end cap 26. A retainer, to be described, co-acts between end cap 228 and base 224 and applies axial retention force therebetween, independently of end cap 26, and independently of any cover forming a housing with base 224 and around the filter element.

End cap 228 extends laterally outwardly to an outer flange 246 laterally outward of filter media 32. A retainer 248 on the outer flange mounts the filter element at end cap 228 to base 224. Filter media 32 has the noted outer border 50, and outer flange 246 has a second outer border 252 laterally outward of outer border 50 and sufficiently laterally extended therefrom to accommodate the noted retainer along the lateral dimension between first and second outer borders 50 and 252. Retainer 248 mounts end cap 228 to base 224 in snap-fit relation with rectilinearly unidirectional axial insertion 254. Retainer 248 is provided by a hook 256 on one of end cap 228 and base 224, preferably end cap 228, and a catch 258 on the other of end cap 228 and base 224, preferably base 224 at laterally extended flange 262. Hook 256 is on a shank 264 which extends axially from a hinge 266 on end cap 228. Hook 256 is laterally moveable (i.e. left-right in FIG. 7) about hinge 266 toward and away from base 224 into and out of engagement with catch 258.

Hook 256 has oppositely axially facing surfaces 268 and 270. Catch 258 has oppositely axially facing surfaces 272 and 274. End cap 228 is mounted to base 224 with axial insertion motion 254, wherein surfaces 270 and 272 are camming surfaces and engage in camming relation to cam hook 256 laterally in a first direction (leftwardly in FIG. 7) until surface 268 moves axially past surface 274, whereupon hook 256 snaps back laterally in a second lateral direction (rightwardly in FIG. 7) opposite to the noted first lateral direction, such that surface 268 axially aligns with and axially engages surface 274 and prevents axial separation of end cap 228 from base 224, i.e. prevents upward axial movement of end cap 228 in FIG. 7. Surface 268 faces axially toward hinge 266. Surface 270 faces axially away from hinge 266. Hook 256 is manually laterally moveable in the noted first lateral direction (leftwardly in FIG. 7) about hinge 266 to move surface 268 out of axial alignment with and out of axial engagement with surface 274 to release hook 256 from catch 258 and permit axial separation of end cap 228 and base 224. Retainer 248 includes first and second legs 280 and 282 meeting at hinge 266 and extending oppositely axially therefrom. Leg 282 provides shank 264 extending from hinge 266 axially to hook 256. Legs 280 and 282 provide a teeter-totter having a fulcrum at hinge 266 such that manual engagement of and lateral movement of leg 280 in a rightward lateral direction in FIG. 7 moves leg 282 in a leftward lateral direction in FIG. 7 by pivoting about fulcrum 266, to release hook 256 from catch 258 and permit axial separation of end cap 228 from base 224. Leg 280 extends from hinge 266 axially toward end cap 26 and is spaced laterally outwardly of filter media 32 by a lateral gap 284 therebetween. To release hook 256, leg 280 is moved laterally inwardly toward filter media 32. Camming surface 272 faces axially toward hinge 266. Locking surface 274 of catch 258 faces axially away from hinge 266. Surface 272 faces axially toward end cap 26. Surface 274 faces axially away from end cap 26. End caps 26 and 228 and base 224 are preferably plastic, and hinge 266 is an integral part of end cap 228.

Figure 8:
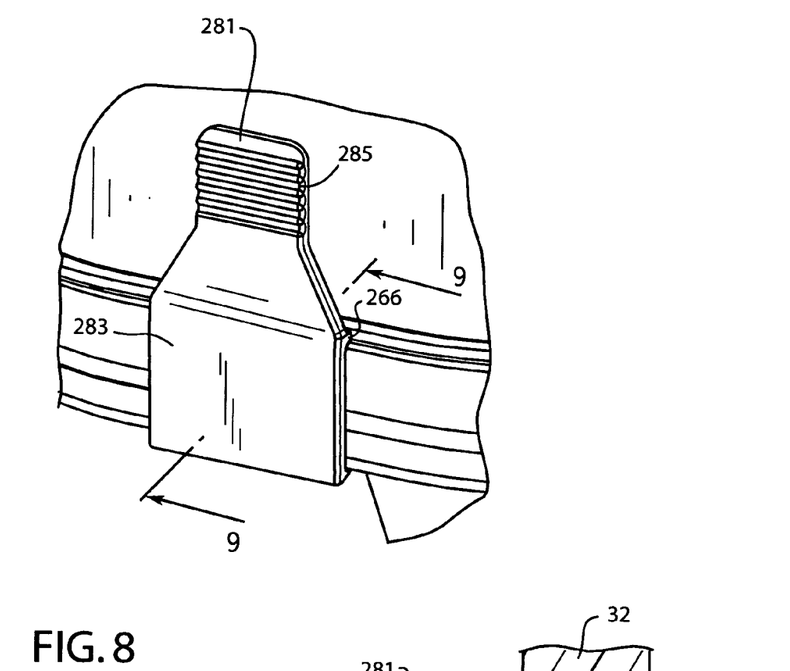
FIG. 8 is a perspective view showing an alternate embodiment of a portion of FIG. 6.
Figure 9:
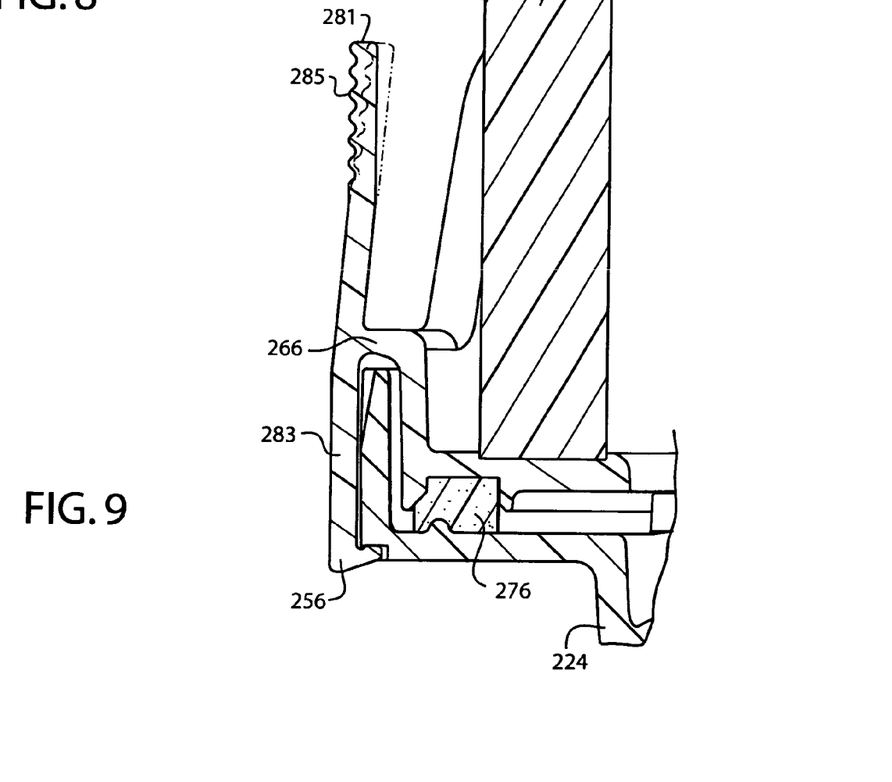
FIG. 9 is a sectional view taken along line 9—9 of FIG. 8.

FIGS. 8 and 9 show another embodiment and use like reference numerals from above where appropriate to facilitate understanding. Legs 281 and 283 are configured aesthetically differently than legs 280 and 282, respectively of FIG. 7. Leg 281 further has a gripping portion 285 different than the outer surface of leg 280. In FIGS. 5–9, an axial sealing gasket 276 is provided between end cap 228 and base 224, for axial sealing, comparably to axial sealing gasket 76.

Figure 10:
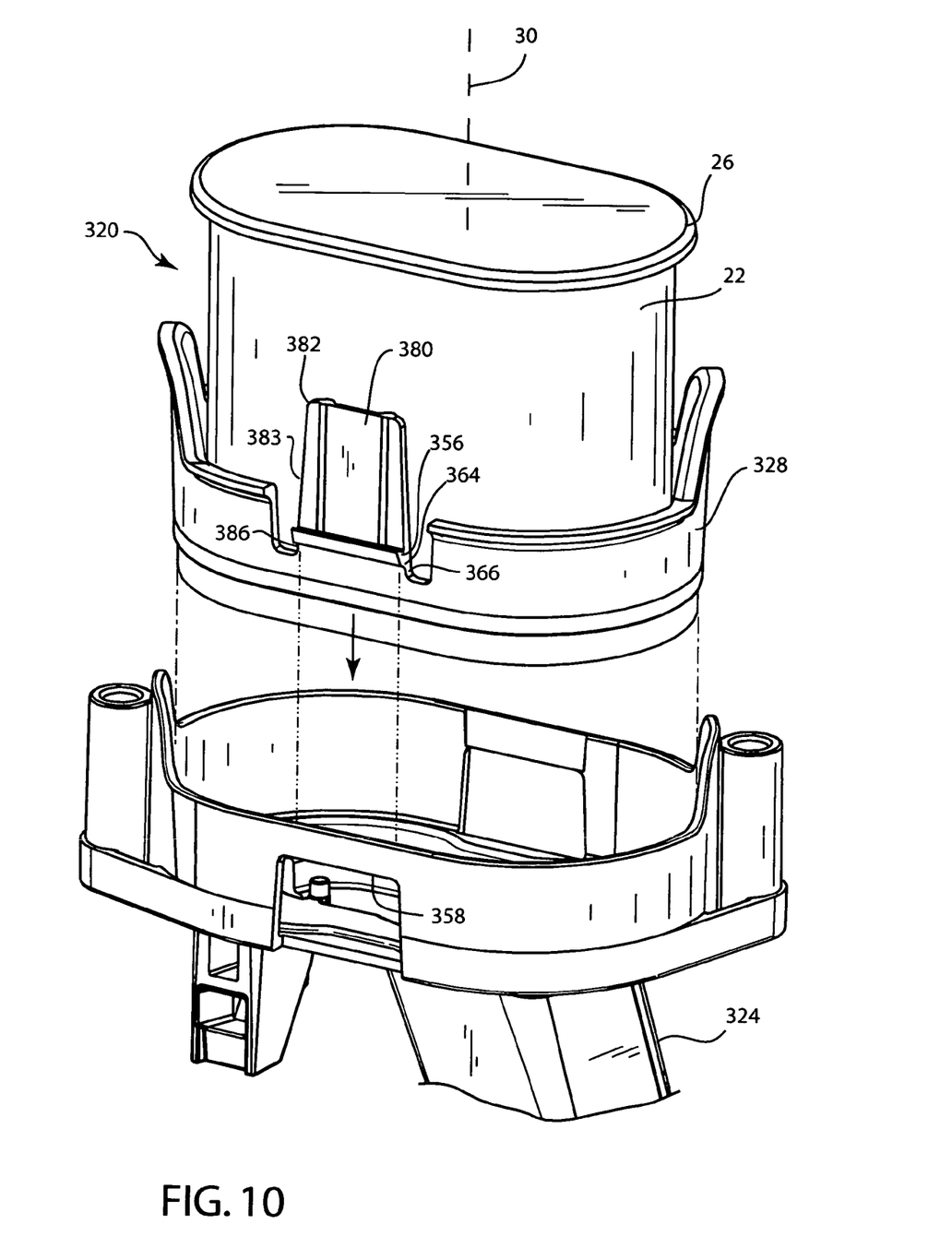
FIG. 10 is an exploded perspective view of another embodiment.
Figures 11, 12:
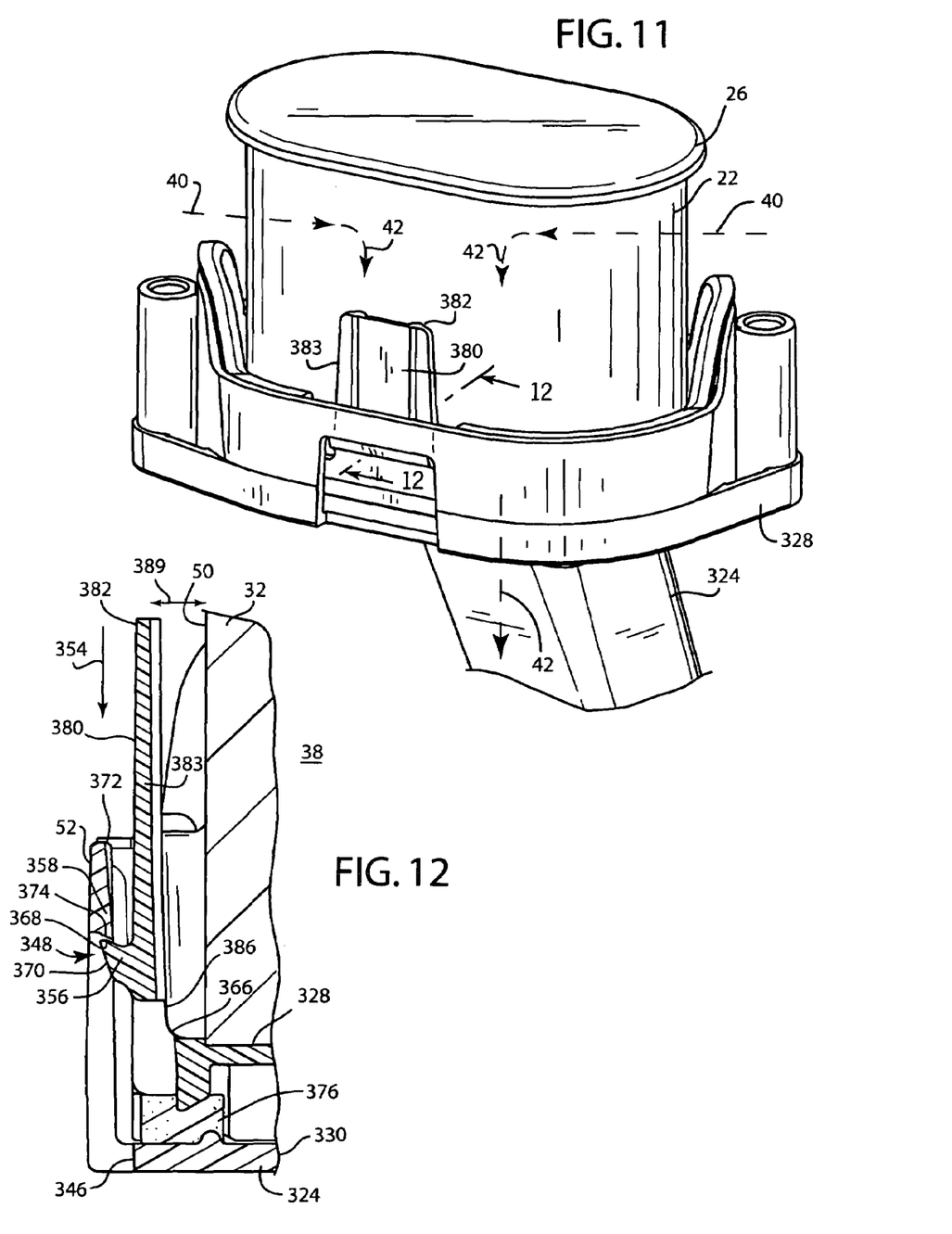
FIG. 11 is a perspective assembly view of the filter of FIG. 10.
FIG. 12 is a sectional view taken along line 12—12 of FIG. 11.

FIGS. 10–12 show another embodiment and use like reference numerals from above where appropriate to facilitate understanding. Filter 320 includes filter element 22 mounted to base 324. The filter element has first and second end caps 26 and 328 spaced axially along axis 30. End cap 328 has an axial flow opening 330 therethrough. Filter media 32 extends axially between end caps 26 and 328, and extends in a closed-loop around a perimeter defining the noted hollow interior 38 communicating with axial flow opening 330. Fluid to be filtered flows laterally through filter media 32 as shown at arrows 40, and axially as shown at arrows 42 through hollow interior 38 and axial flow opening 330. Filter element 22 is mounted to base 324 by end cap 328. Filter element 22 is mounted to base 324 solely by end cap 328, and independently of end cap 26. A retainer, to be described, co-acts between end cap 328 and base 324 and applies axial retention force therebetween, independently of end cap 26, and independently of any cover forming a housing with base 324 and around filter element 22.

End cap 328 extends laterally outwardly to an outer flange 346 for mounting filter element 22 at end cap 328 to base 324. Filter media 32 has the noted first outer border 50. Outer flange 346 has the noted second outer border 52 to laterally outward of outer border 50 and sufficiently laterally extended therefrom to accommodate retainer 348 along the lateral dimension between first and second outer borders 50 and 52. Retainer 348 mounts end cap 328 to base 324 in snap-fit relation with rectilinearly unidirectional axial insertion 354. Retainer 348 is provided by a hook 356 on one of end cap 328 and base 324, preferably end cap 328, and a catch 358 on the other of end cap 328 and base 324, preferably base 324. Hook 356 is on a shank 364 which extends axially from hinge 366. Hook 356 is laterally moveable about hinge 366 toward and away from the filter media, into and out of engagement with catch 358. In the preferred embodiment of FIGS. 10–12, hook 356 is laterally moveable about hinge 366 toward filter media 32 (rightwardly in FIG. 12) out of engagement with catch 358, and is laterally moveable about hinge 366 away from filter media 32 (leftwardly in FIG. 12) into engagement with catch 358.

Hook 356 has oppositely axially facing surfaces 368 and 370. Catch 358 has oppositely axially facing surfaces 372 and 374. End cap 328 is mounted to base 324 with axial insertion motion 354, wherein surfaces 370 and 372 are camming surfaces and engage in camming relation to cam hook 356 laterally in a first lateral direction (rightwardly in FIG. 12) until surface 368 moves axially past surface 374, whereupon hook 356 snaps back laterally in a second lateral direction (leftwardly in FIG. 12) opposite to the noted first lateral direction, such that surface 368 axially aligns with and axially engages surface 374 and prevents axial separation of end cap 328 and base 324, i.e. prevents axial upward movement of end cap 328 in FIG. 12. Surface 368 faces axially away from hinge 366. Surface 370 faces axially toward hinge 366. Hook 356 is manually laterally moveable in the noted first lateral direction (rightwardly in FIG. 12) about hinge 366, FIG. 10, to move surface 368 out of axial alignment with and out of axial engagement with surface 374 to release hook 356 from catch 358 and permit axial separation of end cap 328 and base 324. Retainer 348 is provided by an arm 380 extending axially from hinge 366 to a tab 382. Hook 356 is located axially between hinge 366 and tab 382, and extends laterally from arm 380. Arm 380 has a first segment 383 extending between hook 356 and tab 382, and a second segment 386 extending between hook 356 and hinge 366 and providing the noted shank 364. Manual engagement of the arm at tab 382 and lateral movement of the arm in the noted first lateral direction, namely laterally inwardly toward filter media 32 (rightwardly in FIG. 12) releases hook 356 from catch 358 and permits axial separation of end cap 328 from base 324. Segment 383 of arm 380 extends from hook 356 axially toward end cap 26 and is spaced laterally outwardly of filter media 32 by lateral gap 384 therebetween. Lateral movement of segment 383 and tab 382 inwardly toward filter media 32 releases hook 356 from catch 358. Surface 372 faces axially toward end cap 26. Surface 374 faces axially away from end cap 26. End caps 26 and 328 and base 324 are preferably plastic, and hinge 366 is an integral part of end cap 328. An axial sealing gasket 376 is provided between end cap 328 and base 324.

Axial sealing gaskets 76, 276, 376 are preferably resiliently compressible between the respective second end cap and the base and apply axial bias (axially upwardly in FIGS. 1–12) opposing the noted axial retention force provided by the noted retainer. The retainer provided by the noted respective hooks and catches mounts the second end cap to the base in snap-fit relation upon axial insertion of the filter element onto the base in a first axial direction (axially downwardly in FIGS. 1–12). The retainer releasably applies axial retention force between the second end cap and the base and prevents axial separation of the second end cap from the base in a second axial direction (axially upwardly in FIGS. 1–12). Resiliently compressible axial sealing gaskets 76, 276, 376 between the respective second end cap and the base apply axial bias in the noted second axial direction (axially upwardly in FIGS. 1–12). The noted upward axial bias provided by gaskets 76, 276, 376 enhances a continuous robust engagement of the snap-fit retainer, and improved retention of the filter element on the base in continuous biased engagement. The axial sealing gasket between the second end cap and the base applies an axial bias opposing the axial retention force applied by the retainer.

It is recognized that various equivalents, alternatives and modifications are possible within the scope of the appended claims.

What is claimed is:

1. A filter comprising a filter element mounted to a base, said filter element comprising first and second end caps spaced axially along an axis, said second end cap having an axial flow opening therethrough, filter media extending axially between said end caps and defining a closed-loop around a perimeter defining a hollow interior communicating with said axial flow opening, wherein fluid to be filtered flows laterally through said filter media and axially through said hollow interior and said axial flow opening, said second end cap extending laterally outwardly to an outer flange laterally outward of said filter media, a retainer on said outer flange for mounting said filter element at said second end cap to said base, wherein said retainer mounts said second end cap to said base in snap-fit relation, wherein said retainer comprises a hook on one of said second end cap and said base, and a catch on the other of said second end cap and said base, wherein said hook is on a shank which extends axially from a hinge on said one of said second end cap and said base, and wherein said hook is laterally movable about said hinge toward and away from said other of said second end cap and said base into and out of engagement with said catch.

2. The filter according to claim 1 wherein said hook has first and second oppositely axially facing surfaces, said catch has third and fourth oppositely axially facing surfaces, wherein said second end cap is mounted to said base with axial insertion motion wherein said second and third surfaces are camming surfaces and engage in camming relation to cam said hook laterally in a first lateral direction until said first surface moves axially past said fourth surface whereupon said hook snaps back laterally in a second lateral direction opposite to said first lateral direction such that said first surface axially aligns with and axially engages said fourth surface and prevents axial separation of said second end cap and said base.

3. The filter according to claim 2 wherein said first surface faces axially toward said hinge, and said second surface faces axially away from said hinge.

4. The filter according to claim 2 wherein said first surface faces axially away from said hinge, and said second surface faces axially toward said hinge.

5. The filter according to claim 2 wherein said hook is manually laterally movable in said first lateral direction about said hinge to move said first surface out of axial alignment with and out of axial engagement with said fourth surface to release said hook from said catch and permit axial separation of said second end cap and said base.

6. The filter according to claim 5 wherein said retainer comprises first and second legs meeting at said hinge and extending oppositely axially therefrom, said second leg providing said shank and extending from said hinge axially to said hook, said first and second legs comprising a teeter-toffer having a fulcrum at said hinge such that manual engagement of and lateral movement of said first leg in said second lateral direction moves said second leg in said first lateral direction by pivoting about said fulcrum, to release said hook from said catch and permit axial separation of said second end cap and said base.

7. The filter according to claim 6 wherein said first leg extends from said hinge axially toward said first end cap and is spaced laterally outwardly of said filter media by a lateral gap therebetween.

8. The filter according to claim 7 wherein said second lateral direction of movement of said first leg is laterally inwardly toward said filter media.

9. The filter according to claim 5 wherein said retainer comprises an arm extending axially from said hinge to a tab, wherein said hook is axially between said hinge and said tab and extends laterally from said arm, said arm having a first segment extending between said hook and said tab, and a second segment extending between said hook and said hinge and providing said shank, such that manual engagement of said arm at said tab and lateral movement of said arm in said first lateral direction releases said hook from said catch and permits axial separation of said second end cap and said base.

10. The filter according to claim 9 wherein said first segment of said arm extends from said hook axially toward said first end cap and is spaced laterally outwardly of said filter media by a lateral gap therebetween.

11. The filter according to claim 10 wherein said first lateral direction of movement of said first segment of said arm is laterally inwardly toward said filter media.

12. The filter according to claim 2 wherein said third surface faces axially toward said hinge, and said fourth surface faces axially away from said hinge.

13. The filter according to claim 2 wherein said third surface faces axially toward said first end cap, and said fourth surfaces faces axially away from said first end cap.

14. The filter according to claim 2 wherein said third surface faces axially away from said first end cap, and said fourth surface faces axially toward said first end cap.

15. A filter comprising a filter element mounted to a base, said filter element comprising first and second end caps spaced axially along an axis, said second end cap having an axial flow opening therethrough, filter media extending axially between said end caps and defining a closed-loop around a perimeter defining a hollow interior communicating with said axial flow opening, wherein fluid to be filtered flows laterally through said filter media and axially through said hollow interior and said axial flow opening, said second end cap extending laterally outwardly to an outer flange laterally outward of said filter media, a retainer on said outer flange for mounting said filter element at said second end cap to said base, wherein said retainer mounts said second end cap to said base in snap-fit relation, wherein said retainer comprises a hook on one of said second end cap and said base, and a catch on the other of said second end cap and said base, wherein said hook is on a shank which extends axially from a hinge on said second end cap, and wherein said hook is laterally moveable about said hinge toward and away from said filter media into and out of engagement with said catch.

16. The filter according to claim 15 wherein said hook moves laterally about said hinge toward said filter media and out of engagement with said catch, and wherein said hook moves laterally about said hinge away from said filter media and into engagement with said catch.

17. The filter according to claim 1 wherein said one of said second end cap and said base is plastic, and said hinge is a spring lever.

* * * * *